(12) United States Patent
Degani et al.

(10) Patent No.: US 8,116,546 B2
(45) Date of Patent: Feb. 14, 2012

(54) LUNG CANCER DIAGNOSIS USING MAGNETIC RESONANCE IMAGING DATA OBTAINED AT THREE TIME POINTS

(75) Inventors: Hadassa Degani, Rehovot (IL); Edna Furman-Haran, Ness-Ziona (NL)

(73) Assignee: Yeda Research & Development Co. Ltd., Rehovot (IL)

( * ) Notice: Subject to any disclaimer, the term of this patent is extended or adjusted under 35 U.S.C. 154(b) by 0 days.

(21) Appl. No.: 13/091,196

(22) Filed: Apr. 21, 2011

(65) Prior Publication Data

US 2011/0245657 A1    Oct. 6, 2011

Related U.S. Application Data

(63) Continuation of application No. 11/912,554, filed as application No. PCT/IB2005/002350 on Apr. 28, 2005, now Pat. No. 7,949,164.

(51) Int. Cl.
*G06K 9/00* (2006.01)
*A61B 6/00* (2006.01)

(52) U.S. Cl. ............... 382/128; 382/224; 378/23

(58) Field of Classification Search ............ 382/100, 382/128–134, 168, 170, 173, 181, 189–195, 382/203, 224, 274, 276, 291, 305, 312; 378/5, 378/16, 20, 21, 23; 424/9.3, 9.35
See application file for complete search history.

(56) References Cited

U.S. PATENT DOCUMENTS

| | | | | |
|---|---|---|---|---|
| 6,673,333 B1 * | 1/2004 | Meade et al. | ............... | 424/9.35 |
| 6,950,493 B2 * | 9/2005 | Besson | ............... | 378/16 |
| 7,116,749 B2 * | 10/2006 | Besson | ............... | 378/16 |
| 7,599,542 B2 * | 10/2009 | Brockway et al. | ............... | 382/132 |
| 7,700,075 B2 * | 4/2010 | Weichert et al. | ............... | 424/9.3 |
| 2004/0264627 A1 * | 12/2004 | Besson | ............... | 378/5 |
| 2005/0220265 A1 * | 10/2005 | Besson | ............... | 378/16 |

OTHER PUBLICATIONS

Fujimoto et al, "Peripheral Pulmonary Carcinomas Evaluated with Dynamic MR imaging: Correlation with Tumor Vascularity and Prognosis", Radiology 2003; 227:786-793.
International Search Report published Jan. 25, 2007 for PCT/IB2005/002350, filed Apr. 28, 2005.
International Preliminary Report published Oct. 30, 2007 on Patentability forfor PCT/IB2005/002350, filed Apr. 28, 2005.
Written Opinion published Oct. 28, 2007 for PCT/IB2005/002350, filed Apr. 28, 2005.

* cited by examiner

*Primary Examiner* — Seyed Azarian
(74) *Attorney, Agent, or Firm* — Martin Fleit; Paul D. Bianco; Fleit Gibbons Gutman Bongini & Bianco PL (57) ABSTRACT

A malignancy classification method and medium for diagnosing a region of lung tissue based on MRI data are disclosed. The classifying includes: setting time points $T_1$ and $T_2$ measured from injection of a contrast agent. $T_1$ represents a wash-in time point for malignant lung tissue at which a first concentration value of the injected contrast agent is substantially equal to or near a peak for injected contrast agent concentration in the region of lung tissue. Patient concentration values of the contrast agent for the area of lung tissue at time points $T_1$ and $T_2$ are obtained, and a malignancy classification for the region of lung tissue is provided by comparing the obtained sample concentration values with a predetermined malignancy profile. A visual representation of the malignancy classification of the region of lung tissue is outputted.

36 Claims, 6 Drawing Sheets

LUNG CANCER DIAGNOSIS USING MAGNETIC RESONANCE IMAGING DATA OBTAINED AT THREE TIME POINTS

FIELD OF THE INVENTION

The present application relates to medical imaging devices generally, and to methods, systems, and programs of instructions for the evaluation of potentially malignant tissue based on magnetic resonance imaging (MRI) or other such imaging devices.

BACKGROUND OF THE INVENTION

Lung cancer represents one of the major public health problems worldwide. It has been estimated that between 13 and 2 million people died from lung cancer in the year 2000. The number of deaths caused by lung cancer exceeds those caused by the next three leading cancers together per year (breast, prostate and colorectal cancers). A decrease in mortality from lung cancer by improved diagnostic means would have an enormous impact on public health as well as reducing health care costs.

Ninety-nine percent of lung tumors are malignant, either primary or secondary. Non-Small Cell Lung Carcinoma (NSCLC) represents 80% of the bronchogenic carcinomas, which include Adenocarcinoma, SCC (Squamous Cell Carcinoma), LCC (Large Cell Carcinoma), and others. Small Cell Lung Cancer (SCLC), sometimes known as Oat Cell Carcinoma, comprises the rest of the cases. SCLC is the most aggressive type with a median survival of 2-4 months. Less common types include Sarcoma, Carcinosarcoma, Blastoma, Lymphoma, and Neuroendocrine tumors such as Carcinoids (both malignant an benign).

Since the lung parenchyma lacks nerve endings, tumors of the lung can become large before causing local symptoms such as coughing (75%), dyspnca (60%), pain (50%) and hemoptysis (30%). Fever, wheezing, stridor, hoarseness, SVC (Superior Vena Cava) syndrome, Horner syndrome, dysphagia, pleural effusion, and phrenic nerve paralysis may occur as well. Seventy percent of the patients have non-specific symptoms (such as anorexia, myalgia and weight loss), and a minority are asymptomatic. Some patients present with pneumonia due to bronchial obstruction, and some are diagnosed incidentally by a CXR (Chest X-Ray) assigned for another purpose. Since pulmonary lesions are commonly encountered in clinical practice, differentiation of benign from malignant tissue remains a challenge for the radiologist.

Early detection leads to better prognosis. For example, in stage I the survival rate is 60-70% and in stage Ia even higher. Unfortunately, only 15% of the cases are diagnosed at an early stage (I and II) when the tumor is well localized, so the overall survival rate has not risen recently. The one-year survival rate has increased from 32% in 1973 to 41% in 1994. However, the overall five-year survival rate is only 14%. Concerning lung metastases, the prognosis depends on the type of primary tumor and its biological behavior. For some carcinomas and sarcomas, the five-year survival after lung metastases excision is 25-45%.

The best chance of survival is expected when lung cancer presents incidentally on a CXR as a "coin lesion", or single pulmonary nodule ("SPN"), which is single, peripheral and asymptomatic. The SPN is defined as an abnormal round/oval density of diameter <=3 cm, surrounded by lung parenchyma and lacking cavitations or pulmonary infiltrates. There could be eccentric flecks of calcifications, but not broad or concentric ring calcifications. Approximately 80% of the coin lesions are malignant in patients of age >50 years. Only when the lesion has been known to exist for at least two years without enlarging and with a "benign" calcification pattern, could histological diagnosis be delayed.

Only about half of lesions suspicious enough to undergo an open biopsy turn out to be malignant. This brings about needless morbidity and mortality, and the hospitalization costs of such a patient in the U.S. are about $25,000.

No fixed relationship exists between the size of a nodule and its biological behavior. It is possible that most patients already have metastases at the time of diagnosis, which the routine diagnostic tools do not always detect. This hypothesis is supported by clinical studies in which lymph nodes that appeared normal were found to contain metastases when evaluated by immunohistochemical staining or PCR (polymerase chain reaction).

There is general agreement among the various health organizations in the U.S., that the screening programs customary until recently (CXR and sputum ecology), have not contributed significantly to decrease the death rate. This is not true for the next three most common cancers: breast, prostate and colorectal, for which the death rate has decreased by 1-15% in the pasta decades. It should also be noted, that in the Johns Hopkins Lung Project from the 70's, screening tests were negative in half of the patients that developed lung cancer, and became symptomatic before the next scheduled screening examination. A possible explanation was that some of the cases are so aggressive that even strict follow-up and early detection will not increase survival. Actually, screening is intended mainly for NSCLC (75-80% of die cases), since SCLC is usually widely disseminated at presentation.

The progression and metastasis of lung cancer, as well as other cancers, depend on the capacity of the tumor cells to interact with their microenvironment and induce angiogenesis. This induction is mediated by a large number of angiogenic factors which collectively lead to capillary bud proliferation and sprout extension into the tumor, as well as migration of the tumor cells toward the vessels. Previous studies have shown that angiogenesis of lung cancer may begin early in the malignant process, as bronchial dysplasia and carcinoma in situ already have increased vascularity. In addition the formation of a new capillary network in NSCLC correlated with tumor progression as well as ah increased rate of metastases and poor prognosis. In an attempt to improve the prediction of prognosis/microvessels density (MVD) was also correlated with me tumor expression of different angiogenic factors such as the vascular endothelial growth factor (VEGF). However, recent studies of MVD in NSCLC did not find this parameter to be a predictor of survival. The contradictory results most likely present an inconsistency, as well as inter-observer variability of the MVD methodology.

In view of the need to improve lung cancer diagnosis and assessment of prognosis, as well as to test the efficacy of new antiangiogenic treatments targeted to lung cancer it is critical to develop non-invasive imaging methods that can quantitatively monitor temporal and spatial changes in tumor vasculature throughout the whole tumor.

Dynamic contrast enhanced magnetic resonance imaging (DCE-MRI) provides an effective means of monitoring non-invasively and with high spatial resolution the microvascular properties of tumors. The increased permeability of tumor vasculature gives rise to increased leakage of tracers including MRI contrast agents, and enables characterization of enhancement patterns in the tissue. DCE-MRI has been applied to the evaluation of solitary pulmonary nodules (SPN) and, based on empiric quantifications of the contrast enhancement, a potential role for its use for non-invasive evaluation of SPN diagnosis and assessment of treatment was found. In previous clinical studies, Fujimoto et al demonstrated that MVD and VEGF-expression, in peripheral pulmonary carcinomas well correlated with contrast enhanced MRI empirical parameters. The empirical parameters included as maximal (peak) enhancement, curve slope and washout rate. Similarly, in contrast enhanced dynamic CT studies of primary lung carcinoma in patients it was found that the maximum attenuation values of time attenuation curves correlate with the number of small vessels and with endothelial cell markers and may predict VEGF-related tumor angiogenesis. The enhancement patterns can be further analyzed by mathematical models that relate the dynamic changes in the signal intensity to physiologic parameters such as the influx and efflux transcapillary transfer constants, which are also related to the surface area and permeability of the microvasculature.

MRI differentiates between solid and vascular structures, even without contrast material. Most importantly, MRI uses relatively harmless radio waves and there is no exposure to ionizing radiation as in CT. Due to longer acquisition time, patient movement is more detrimental. The potential role of dynamic contrast enhanced MRI-based evaluation of SPNs was first described by Hittmair et al. The maximum enhancement and the initial velocity of contrast uptake were assessed and correlated with pathohistological findings. Malignant neoplastic SPNs enhanced stronger and faster than benign neoplastic SPNs.

More recently, additional DCE-MRI studies of SPNs confirmed the early results. The parameters measured were peak enhancement and slope of enhancement and in some studies wash-out ratio and time to maximum were added as well. In Fujimoto's study, the DCE-MRI parameters correlated with tumor vascularity suggesting a potential use for this method to predict prognosis.

However, ways of determining two optimal MR data imaging times in contrast enhanced MR imaging in order to distinguish malignant from non-malignant tissue have still not been make known.

SUMMARY OF THE INVENTION

A method, system and computer-readable medium that provide a malignancy classification for a region of lung tissue based on MR image data are disclosed. The classifying operation includes some or all of the following: time points $T_1$ and $T_2$ measured from a the point $T_0$ at or near an injection of a contrast agent are set as described below. $T_1$ represents a wash-in time point for malignant lung tissue at which a first concentration value of the injected contrast agent is substantially equal to or near a peak for injected contrast agent concentration, in the region of lung tissue. $T_2$ may be set such that a second concentration value of the injected contrast agent for malignant tissue is less than the first concentration value, and a third concentration value of the injected contrast agent for non-malignant tissue at $T_1$ is less than a fourth concentration value of the injected contrast agent concentration for the non-malignant tissue at $T_2$.

Also $T_2$ may be set such that the second concentration value of the injected contrast agent for malignant tissue is substantially equal to me first concentration value, provided that the first concentration value exceeds a certain threshold value. Patient concentration values of the contrast agent for the area of lung tissue at time points $T_1$ and $T_2$ are obtained, and a malignancy classification for the region of lung tissue is provided by comparing the obtained sample concentration values with a predetermined malignancy profile. A representation of the malignancy classification of the region of lung tissue is outputted. It will be understood that intensity data may be collected at time points in addition to time points $T_0$, $T_1$ and $T_2$, for example to verify the accuracy of the data collected at $T_1$ and $T_2$, or for other reasons.

The time points may beset such that the second concentration value is greater than the fourth concentration value. Also, setting of the time points $T_1$ and $T_2$ may also include calculating concentration values of the injected contrast agent at initial time points $T_1$ and $T_2$, finding a maximum intensity for a calibration map comprising a grid with axes K and v. K representing a microvascular permeability value and v representing an extracellular volume value, and obtaining normalized intensity values of each grid point of the calibration map based on the maximum intensity; assigning one of multiple categories to each grid point based on a degree of change in concentration values between initial time point $T_1$ and initial lime point $T_2$; and adjusting the calibration map such that grid points of a first category for grid points with a relatively high degree of change and grid points of a second category for grid points with a relatively low degree of change are approximately equally represented in the calibration map.

The assigning of the one of the three categories may be done, for example, by coloring or shading the grid point.

Further, $T_1$ and $T_2$ may be set such that me first classification is assigned to approximately 75% of grid points representing malignant tissue.

According to an aspect of the invention, the visual representation of the malignancy classification that is output may be color-coded image data. Also, the representation may be a voxel (volume pixel) representation, such that each pixel represents a volume of tissue.

The region of lung tissue may be evaluated based on the spatial distribution of malignant tissue in the visual representation.

Further, registration can be used to correct for shifting of the region of tissue in the obtaining of the concentration values. Also, in outputting of the visual representation smoothing based on surrounding pixels may be used to provide a more satisfactory image.

DETAILED DESCRIPTION OF THE INVENTION

The following discussion and the foregoing figures describe embodiments of Applicant's invention as best understood presently by the inventor however, it will be appreciated that numerous modifications of the invention are possible and that the invention may be embodied in other forms and practiced in other ways without departing from the spirit of the invention. Further, features of embodiments described may be omitted, combined selectively, or as a whole, with other embodiments, or used to replace features of other embodiments, or parts thereof, without departing from the spirit of the invention. The figures and the detailed description are therefore to be considered as an illustrative explanation of aspects of the invention, but should not be construed to limit the scope of the invention.

Some of the conclusions stated in the following discussion are based on a study performed by the inventors in which dynamic contrast enhanced MRI experiments involved an animal model of orthotopic NCI H460 NSCLC implanted in immunodeficient rats. The analysis of the dynamic images was based on a physiological model that yielded high resolution parametric images of the influx and efflux transcapillary transfer rates. The distribution of these parameters also revealed the heterogeneous nature of the vascular network function. The results of this study served as a basis for the development of a computer aided parametric method for lung cancer diagnosis by the determination of some possible optimal time point based on the pharmacokinetics of the injected agent for the malignant tissue studied.

The method scans high resolution contrast enhanced images at three different time points judiciously chosen to maximize the dynamic information, hence the term 3TP, or Three Time Point method. It will be understood that intensity data may be collected at lime points in addition to lime points $T_0$, $T_1$ and $T_2$, for example to verify the accuracy of the data collected at $T_1$ and $T_2$, or for other reasons.

Processing algorithms relate the changes in signal intensity to the kinetics of the contrast time evolution using a color-coded scheme. Therefore, in describing aspects of Applicant's invention, reference is sometimes made to terms and concepts used in this study, however it will be understood that the description of the study is provided only as an example of an MRI application of the present invention.

The type of contrast agent used and its dose will depend on the type of imaging device from which imaging data is gathered. The image data received, such as signal intensity will depend on the type of contrast agent used. This information might be available from the company that provides the contrast material, or it can be independently measured as described below for the contrast agent.

Enhancement, E(t), is defined as the difference in signal intensities before and after contrast material injection:

$$E(t)=[I(t)-I(t_0)]/I(t_0) \quad \text{Eq. (1)}$$

where I designates signal intensity.

Assuming similar, pharmacokinetics for all patients with normal kidney function, $C_p(t)$ in ml contrast agent per liter blood may be given by the equation:

$$Cp(t)=D(a_1 e^{-m1t}+a_2 e^{-m2t}) \quad D=\text{dose in ml/kg} \quad \text{Eq. (2)}$$

The exchange of contrast material between the intravascular and extravascular extracellular volumes in each pixel of the tumor is dependent upon two parameters: the influx transcapillary transfer constant $k_{in}$ and the efflux transcapillary constant $k_{ep}$. The latter constant is equal to the outflux transcapillary constant $k_{out}$ divided by the effective extracellular volume fraction $v_e$. The division by $v_e$ stems from the fact that the contrast material cannot enter, the cells and is therefore leaking solely to the extracellular interstitial spaces. When the transfer constant from the capillaries to the interstitial spaces and back are equal, namely $k_{in}=k_{out}$, then $k_{in}/k_{ep}=v_e$. Hence $k_{in}$ and $v_e$ are two independent parameters that determine the contrast enhancement time course.

Furthermore, $k_{in}$ depends on both the blood flow rate and the vessel permeability. When the blood flow per pixel is much faster than the vessel permeability (P) times surface area (S) per unit volume (V), PS/V, $k_{in}$ values are determined by the multiplicity PS.

The solution to the differential equation that describes the concentration of contrast agent at time t after a bolus contrast administration, for $k_{in}=k_{out}$ is, given by the following equation:

$$C_t(t)=D(b_1 e^{-m1t}+b_2 e^{-m2t}+b_3 e^{-m3t}) \quad \text{Eq. (3)}$$

where $b_1=k_{in}a_1/(k_{in}/v-m_1)$, $b_2=k_{in}a_2/(k_{in}/v-m_2)$, $b_3=-(b_1+b_2)$ and $m_3=k_{in}/v_e=k_{ep}$.

This equation represents an initial increase of $C_t(t)$ with time, as the contrast material is transferred from the blood vessels into the tumor's extracellular space, followed by a decrease as the contrast agent is cleared from the tumor back to the blood.

In the study performed, Human NCI-H460 NSCLC cells were obtained from the American Type Culture Collection (Rockville, Md.), and were cultured routinely in RMPI 1640 medium supplemented with 2 mM L-glutamine, 10 mM HEPES, 10% fetal bovine serum, and combined antibiotics. Female nude rats CR: NIH-RNU (NCI, Frederick, Md.), 9-15 weeks old (n=9), were whole-body gamma irradiated with 500 rad, prior to cells injection. Several hours (5-6 hours) after die irradiation, cells (1×107) suspended in 0.1 ml saline were injected intrabronchially by a Teflon catheter advanced into the right main bronchus via a small tracheotomy incision. During this surgical procedure rats were anesthetized with i.m. Ketamine-Xylasine (60 and 8 mg/kg respectively). The rats were then treated prophylactically with Augmentin at 0.35 mg/ml drinking water for two weeks after implantation. Animals were followed for up to 25 days after implantation. Tumors were monitored by MRI, from day 10 to day 25, after tumor implantation. During the MRI experiments, rats were anesthetized by an i.p. injection of Sodium Pentobarbitone 0.04 gr/kg.

After euthanasia, lungs were surgically removed, fixed with 4% formaldehyde, and cut in a plane parallel to that of the MRI. The sections were then embedded in paraffin, sectioned to obtain 4 μm slices and stained with hemaloxylin-eosin. (All protocols were approved by the institutional Animal Care and Use Committee) MR images were acquired with a 4.7 Tesla Biospec spectrometer, equipped with a 1H radiofrequency coil 7.5 cm in diameter (Bruker, Germany). The imaging protocol, for each animal, included spin echo (SB) images followed by dynamic contrast enhanced MRI.

Coronal images of the chest were acquired with a multi-slice multi-echo spin echo (SE) sequence using an echo time (TE) of 15, 30, and 45 msec, a repetition time (TR) of 2362 msec, 2 averages, 23 mm slice thickness, 6 cm FOV, and in-plain resolution of 234 μm×468 μm. A selected slice where the tumor was best seen was recorded again with a respiratory-gated cardiac-triggered (Physiograd SM 785 NMR trigger unit—Bruker), and the same SE sequence. T1 relaxation time was measured in vivo by applying an SE imaging sequence with a constant TE of 15 msec and variable TR values (15 values) ranging from 250 msec to 6000 msec.

DCE-MRI experiments included recording of a pre-contrast scan followed by a bolus injection of Gadolinium-diethylene triamino pentaacetic acid (Gd-DTPA) (Schering, Berlin, Germany) into the tail vein, and a subsequent series of 20 post contrast scans. A T1-weighted 3D-gradient-echo (GE) sequence was acquired, with TE/TR=2.1/25 msec, nominal flip angle=60°, and 234×468×2500 mm3 voxels, and 1 min temporal resolution.

To determine contrast agent pharmacokinetics, GdDTPA was injected as a bolus into the tail of the rats at a dose of 0.1 mmol/kg. Changes in the bolus concentration of the contrast agent after injection were monitored by fitting the signal enhancement curves of the in vivo DCE-MRI studies, of regions of interest at the heart ventricle or in one of the great vessels, to a bi-exponential decay. Similar values were previously derived by measurements of blood samples taken after the bolus injection.

Tumor volume was measured from the T2-weighted images with the standard Bruker program for image analysis, by measuring the area at each slice, and taking into account the slice thickness and the slice to slice distance.

In order to minimize motion effects in the lungs, prior to dynamic image analysis of the lung tumors, all post-contrast images of each experiment were registered to the pre-contract image by an image registration tool. However, it will be understood that other registration methods may be used and that registration is not essential to carrying out three-time point detection, according to the spirit of the present invention.

The time-dependent changes in signal enhancement were processed pixel-by-pixel using Tofts' physiological model, the contrast agent pharmacokinetics and pre-contrast T1 values (Table 1), and the calibration algorithms herein described.

TABLE 1

Parameters used in analyzing the dynamic Gd-DTPA[a] enhanced MR images in H460 NSCLC tumors implanted orthotopic in nude rats.

| Parameter | Definition | Value in nude rats |
|---|---|---|
| D mmol/kg wt | Dose | 0.1 |
| Pharmacokinetic Parameters of Gd-DTPA[a] in Plasma | | |
| $a_1$ [kg/liter] | Amplitude of fast decay | 9.44 |
| $a_2$ [kg/liter] | Amplitude of slow decay | 3.99 |
| $m_1$ [min$^{-1}$] | Fast decay time constant | 0.75 |
| $m_2$ [min$^{-1}$] | Slow decay time constant | 0.033 |
| Nuclear Relaxation Times of H460 NSCLC[b] Tumor Tissue | | |
| $R_1$ [s$^{-1}$mM$^{-1}$] | $T_1$ relaxivity | 4.2 {Furman-Haran, 1997 #16} |
| $T_1$ [sec] | Tumor $T_1$ relaxation time | 2.0 sec |

Figure 2:
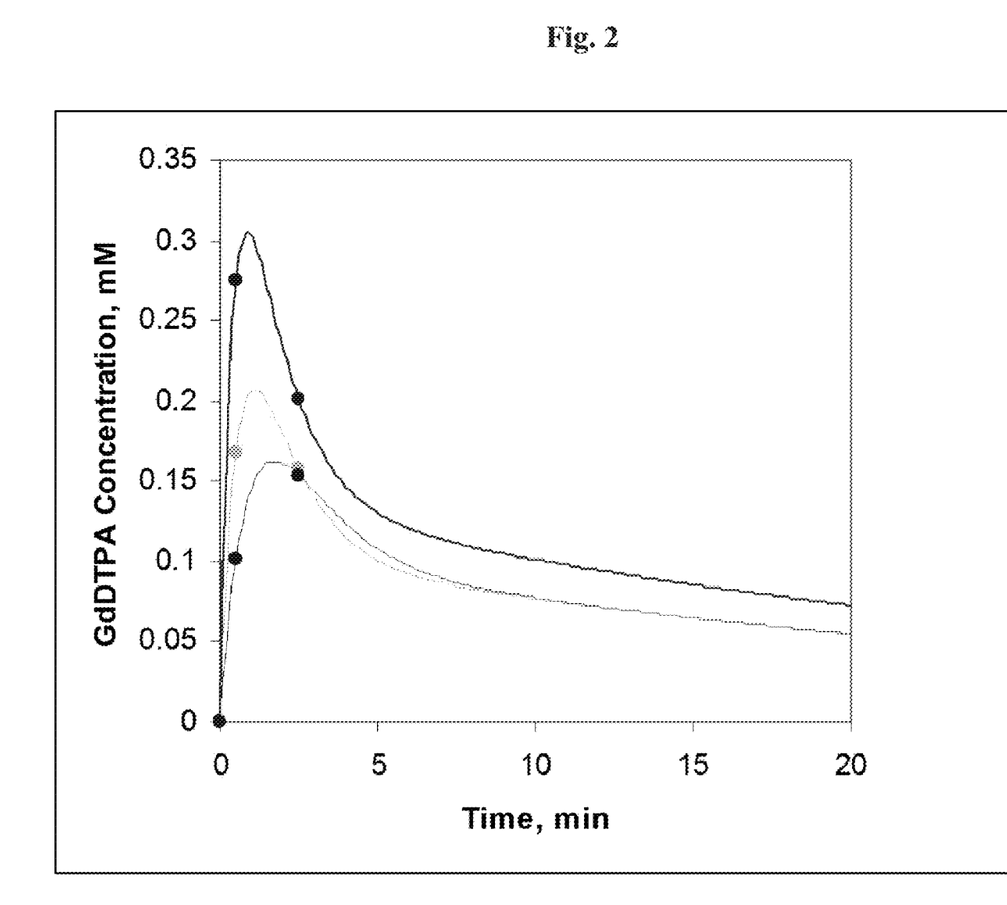
FIG. 2 is a chart illustrating the variation of contrast agent concentration (y-axis) as a function of time (x-axis).

[a]Gadolinium-diethylene-triamino-pentaacetic acid.
[b]NSCLC—Non Small Cell Lung Carcinoma FIG. 2 is a chart illustrating the variation of contrast agent concentration (y-axis) as a function of time (x-axis) for the 25th percentile (lower curve), the 50th percentile (middle curve) and the 75th percentile (upper curve) of data in the study, with two time points $T_1$ and $T_2$, at 0.5 minutes and 2.5 minutes, respectively. These time points for $T_1$ and $T_2$ seem to be advantageous, according to an aspect of the present invention, at least for the type of data analyzed. Compared to tumors in other parts of the body such as breast and prostate, at least in animal models, the wash-in and wash-out rates are faster due to the increased blood supply. The relatively early optimal time points, 0.5 minutes and 2.5 minutes, respectively, reflect this principle.

In the study, all nine rats developed cancer tumors in their lungs. Five tumors grew in the right lower lobe, three in the right accessory lobe, and one in the left lung. Three rats died before MRI experiments were completed (two from the anesthesia in the MRI and one of an unknown reason). Therefore MRI results are presented for six orthotopic lung cancer tumors. Microscopically, the tumors looked very poorly differentiated. The rumors were usually organized as a group of nodules, embedded in the healthy lung parenchyma and around bronchi. The viable areas were composed of dense carcinoma cells, and areas of necrosis were spotted only in larger tumor nodules. For the MRI Measurements of H460 NSCLC tumors, the tumors were characterized by high tissue density in comparison to the surrounding healthy lung parenchyma. The inventors therefore were able to track in vivo tumor growth and measure tumor size by the differently weighted spin echo images. The tumor mass and the tumor boarders were clearly observed in the various echo times. The smallest tumor detected was 0.3 cm in diameter, and the largest tumor was 2.4 cm in diameter. The signal intensity in the healthy lung parenchyma was very low, while, the tumor mass demonstrated a high intensity. Other high intensity features in the spin echo images were related to the spinal cord, the heart and the chest wall. The presence and location of the tumors were confirmed at the end of the experiment by correlation to the corresponding histological slices.

The parametric analysis showed that the wash-in and wash-out patterns of signal enhancement in the orthotopic tumors differed between various areas in the same tumor and between tumors. Fast enhancing areas were unevenly distributed in the lesion with no sign of specific rim enhancement. Most tumor areas showed very fast wash-in and a fast wash-out within 1.5 minutes from contrast material administration, in parallel to the arterial input function measured in the heart and large vessels. Images recorded 20 min after contrast administration showed in most regions a complete wash-out. In some inner tumor regions there was no contrast enhancement, throughout the whole measurement.

The model-based computer aided analysis of the registered images yielded color coded parametric images of the vascular perfusion parameters: the influx transcapillary transfer constant, $k_{in}$ and the efflux transfer rate constant, $k_{ep}$. Pixels that were best fitted to the model were chaotically distributed in the tumors. Histograms of the distribution of the vascular parameters per lesion revealed a broad, skewed and asymmetric distribution of the data around their respective means, with a substantial difference between the average and median values. Therefore, the typical vascular parameters of each group were presented in terms of their 25th percentile, median, and 75th percentile. Table 2 summarizes the distribution of the kinetic parameters' values in the tumors. The effective extracellular volume fraction ($v_e$) values (calculated from me ratio $k_{in}/k_{ep}$) in the tumors was 0.29±0.04.

TABLE 2

Statistical analysis of the vascular perfusion parameters of orthotopic human NCI-H460 NSCLC lung tumors in rats, where $k_{ep} = k_{in}/v_e$.

| Parameter | | Tumors, (n = 6) |
|---|---|---|
| Influx transcapillary transfer constant: ($k_{in}$) (washin constant) | 25th percentile | 0.21 ± 0.10 min$^{-1}$ |
| | Median | 0.42 ± 0.15 min$^{-1}$ |
| | 75th Percentile | 0.81 ± 0.31 min$^{-1}$ |
| Efflux transcapillary rate constant ($k_{ep}$) (washout constant) | 25th percentile | 0.82 ± 0.41 min$^{-1}$ |
| | Median | 1.61 ± 0.54 min$^{-1}$ |
| | 75th Percentile | 2.32 ± 0.87 min$^{-1}$ |
| % of tumor ($R^2 > 0.5$) | | 31% ± 10% |
| Tumor Volume | | 0.83 ± 0.92 cm$^3$ |

Image analysis also included maps of the fitting quality represented by R2. Only a fraction (≦50%) of the pixels showed good fitting to the physiological model with R2>0.5 (Table 2). In pixels with lower R2 values the enhancement was very low and delayed.

FIG. 2 demonstrates simulation of the dynamic changes following GdDTPA bolus injection. The simulated data (obtained using the 25th percentile, median, and 75th percentile of $k_{in}$ and $k_{ep}$ values from Table 2, above) shows a fast GdDTPA wash-in and fast wash-out. By selecting the three time points, 0, 0.5 min and 2.5 min, a good separation between, the different patterns of contrast enhancement is achieved. Specifically, "hot spots" with high $k_{in}$ and high $k_{ep}$ in the lesions, which serve as a marker for cancer-diagnosis, will be depicted and colored in red. However, it will be understood that other time points may be advantageously chosen, and that optimal time points will vary based on the type, and dose of agent injected and the equipment.

The final output included parametric maps of the influx transcapillary transfer constant ($k_{in}$) and the efflux transcapillary rate constant ($k_{ep}$). Additionally, the extracellular volume fraction accessible to the contrast agent (v or "ne") was calculated from the ratio $k_{in}/k_{ep}$=ne. The quality of fit was represented by the proportion of variability R2 calculated for each pixel.

The statistical analysis of the transfer constants included pixels that fitted the mathematical model with R2<0.5. Histograms of the physiological parameters $k_{in}$, $k_{ep}$ were generated for every tumor. For each histogram, we calculated the mean, standard deviation, 25th percentile, median, 75th percentile; and inter-quartile range (IQR, the difference between the 75th percentile and the 25th percentile). The statistical analyses were performed with MATLAB version 6.5.

The method of the present invention for lung cancer diagnosis is based on monitoring intensity changes in sequential images recorded before and after administration of a contrast agent such as, but not limited to, gadodiamide. The images are recorded at three time points judiciously chosen to maximize the diagnostic information.

Mathematical algorithms estimate at pixel resolution two physiological parameters:

$k_{in}$—Microvascular (Permeability×Surface area) per unit Volume $k_{in}/k_{ep}=v_e$=EVF—Extracellular Volume Fraction Model-based methods of dynamic contrast-enhanced MRI including the 3 TP method that optimizes spatial resolution and Uses three pre-selected time points were evaluated in this study for detection of lung cancer.

The 3 TP algorithm codes the signal intensity change on a per pixel basis, between three selected time points using color intensity and color hue which relate to a model based calibration map that uses five same color coding. Suggested diagnosis of cancer is based on predominance of pixels with high permeability and low to intermediate EVF. In the study, the 3 TP images of the lungs were evaluated in comparison to the $k_{in}$, $k_{ep}$ and EVF maps derived from the full kinetic analysis.

Before starting the evaluation of patient data and the diagnosis reporting based thereupon, calibration of the imaging device may be necessary. For each contrast agent it may be necessary to calibrate according to the pharmacokinetic parameters of the injected agent in the blood. The following discussion will illustrate aspects of Applicant's invention with reference to data input from a MR imaging device and a contrast agent appropriate therefor.

Figure 4A:
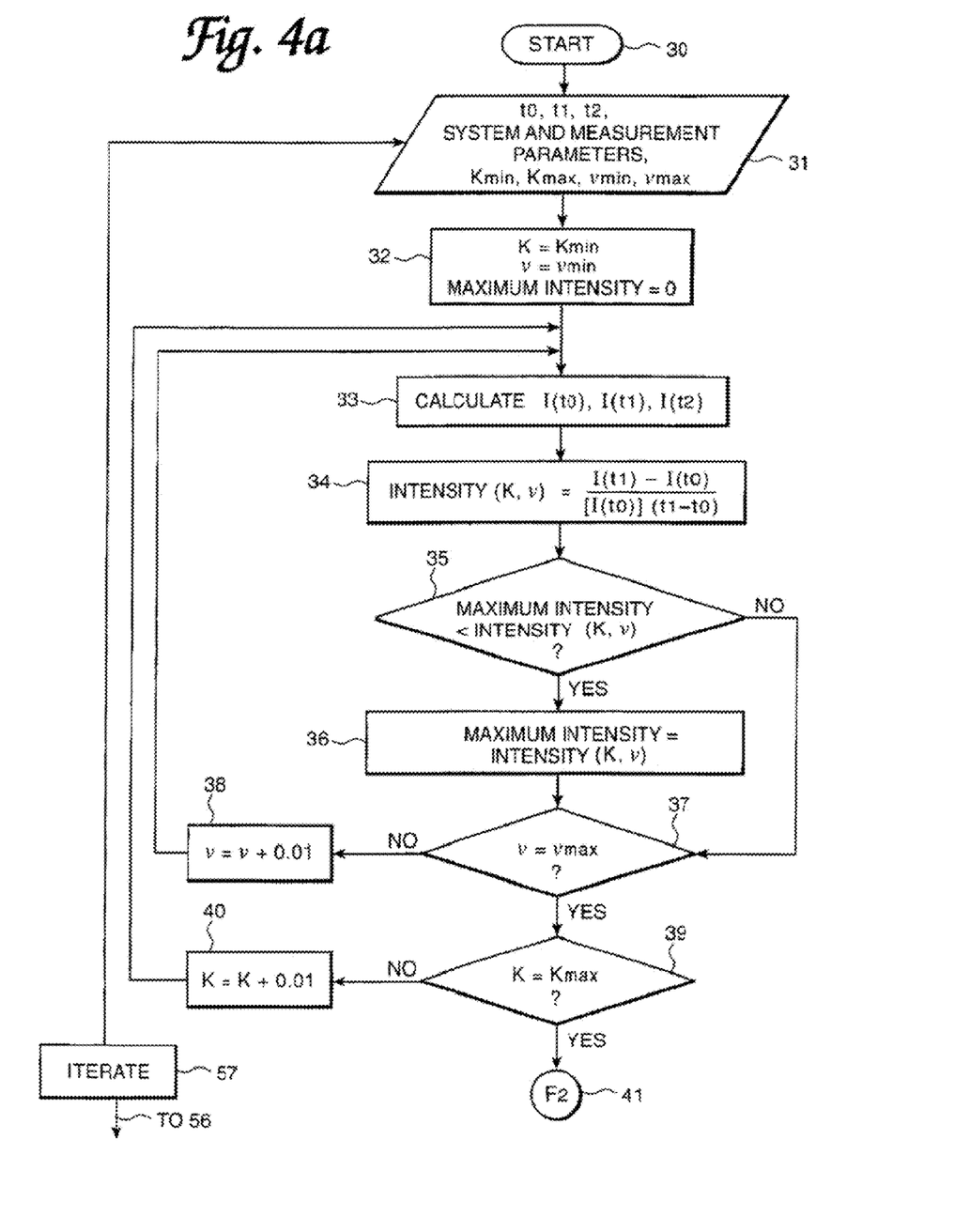
FIGS. 4a-4b show a flow diagram for preparation of a calibration map, according to an aspect of the invention.
Figure 4B:
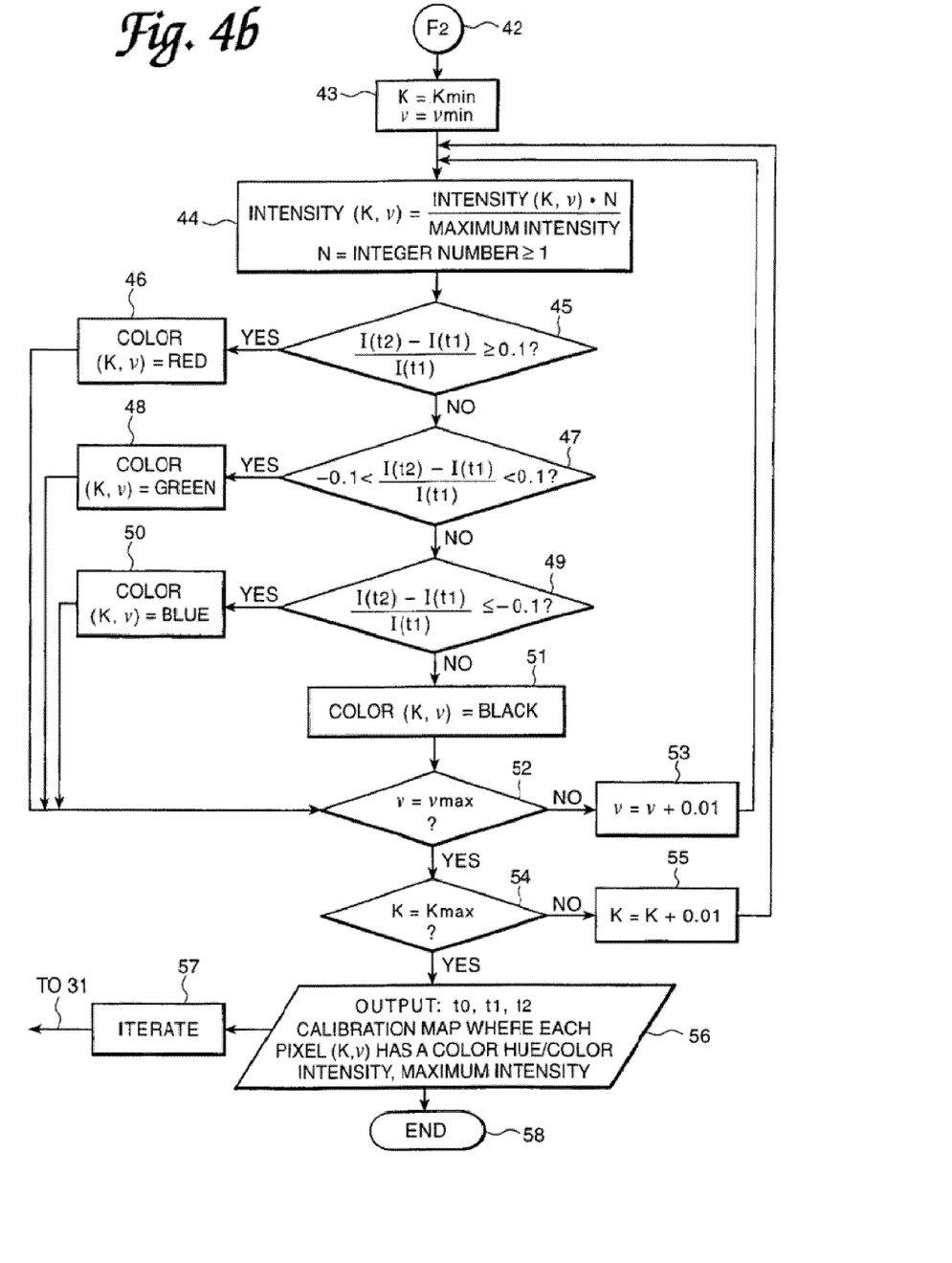

FIG. 4 shows a flow diagram as an example of a method for setting the parameters for data collection and creating a calibration map. This flow diagram shows that concentration of the contrast agent varies with time as a function of two variables of the system assigned here with the letters K and v. The pharmacokinetics parameters define the contrast agent change with time in the blood. The variable K defines microvascular permeability which estimates the capacity of blood vessels to leak out the tracer. The variable v defines the fraction of extracellular volume which estimates the amount of free space in a tissue. For each grid point in a 2 dimensional grid of K and v, a pixel of dimension of 0.01 units of K and 0.01 units, of v is defined at blocks 38, 40, 53 and 55.

Figure 1:
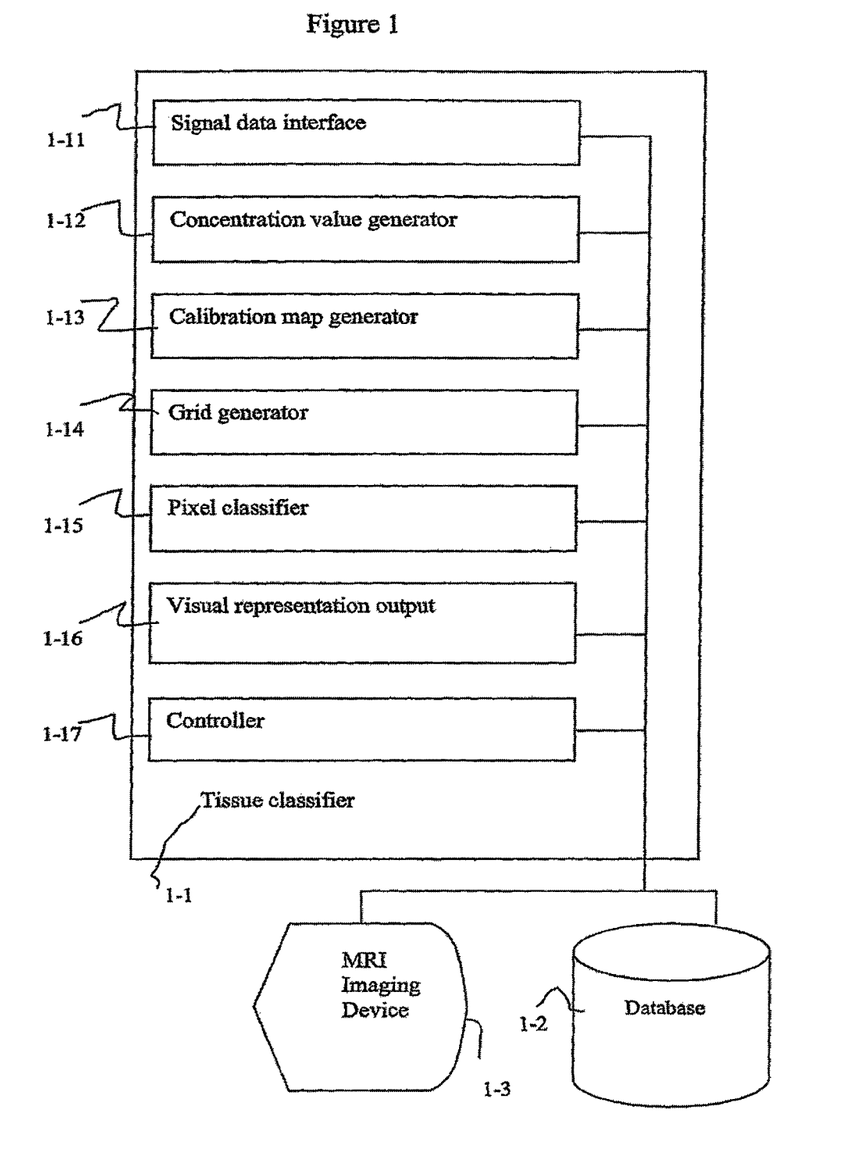
FIG. 1 is a schematic diagram of a tissue classifier according to an aspect of the invention.

The program starts at block 30 and gets inputs of the time points, $T_0$, $T_1$ and $T_2$, system and measurement parameters and the range of K and the range of v values between their minimum and maximum values in block 31. As shown in FIG. 1, the signal values are fed to signal data interface 1-11 of the tissue classifier 1-1 from the MR imaging device 1-3 or other such imaging device. It will be understood that the entire tissue classifier 1-1, or one or more portions or modules thereof may be physically or logically integrated with the MR imaging device 1-3 as a software, hardware, firmware, or other such component or module of the MR imaging device 1-3, or the tissue classifier 1-1, or one or more portions thereof, may be connected via a wired or wireless connection with die MR imaging device 1-3.

The data may be saved in database 1-2. Database 1-2 may be physically or logically integrated with the tissue classifier 1-1 and/or with the MR imaging device or may be connected thereto via a wired or wireless connection. Controller 1-17 may control the input/output of the tissue classifier 1-1, its interface with the MR imaging device 1-3 and with a human operator, and may control overall functioning of the tissue classifier 1-1. Concentration value generator 1-12 converts the signal intensities to concentration values, according to a function (or lookup table) of the type shown in FIG. 1. Alternatively, the MR or imaging device may already feed the concentration values to the tissue classifier 1-1, instead of just the signal strength data.

Calibration map generator 1-13, or grid generator 1-14 as a module of calibration map generator 1-13, starts from pixel (K min, v min) in block 32 to calculate $I(t_0)$, $I(t_1)$, $I(t_2)$ in block 33, estimating how the concentration varying with time I(t) depends on K and v, and on other system parameters. The determined or calculated I(t1) and I(t0) are used to calculate for each pixel Intensity (K, v) as shown in block 34, which represent wash-in initial rate, at least for malignant tissue.

The calibration map generator 1-13 controls a search for the pixel that has maximum intensity (blocks 35 to 40) and proceeds through all the pixels loop-wise returning to block 33 and going again through the steps 34 to block 40 until it reaches the pixel with maximum K and maximum v. Through this search process, the pixel with maximum intensity is identified and intensity is calculated for all pixels (K, v). In FIG. 4b, the program proceeds to calculate for each pixel starting from pixel (K min, v min) block 43 a normalized intensity, normalized relative to the maximum intensity, as shown at block 44. The pixel with maximum intensity is assigned a maximum value for intensity N. N can be 1, 2, 3 or any number such as, 8, 64, 256 (computer numbers), etc. depending on the demands of the system.

Figure 3:
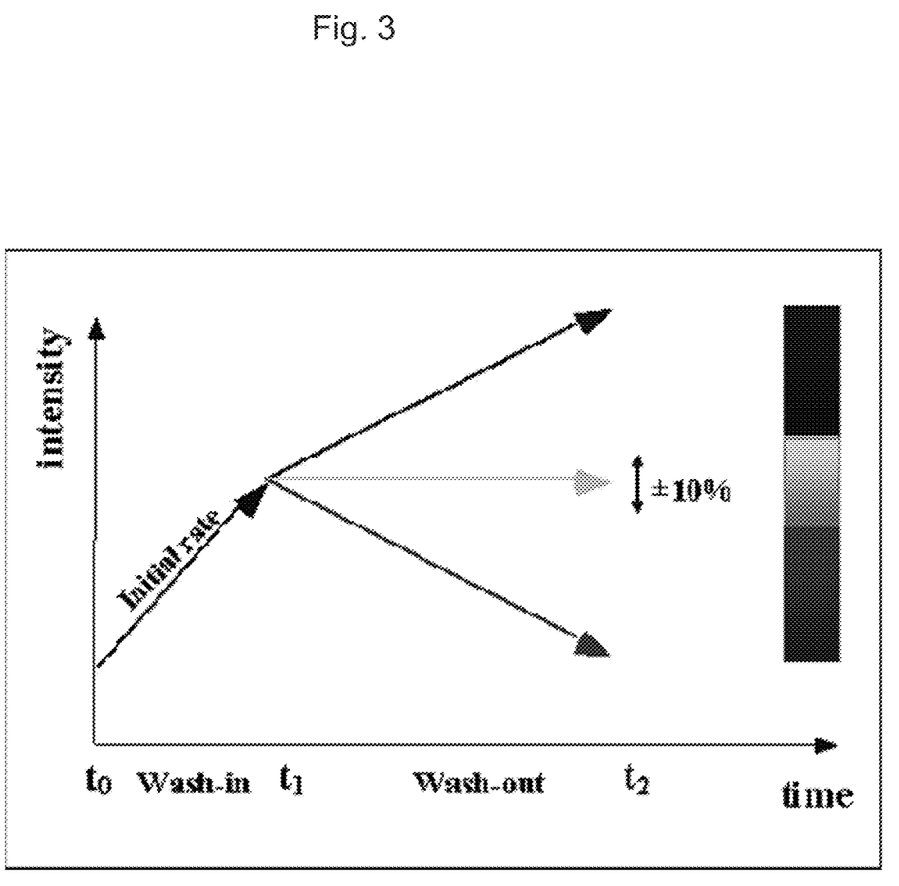
FIG. 3 is a diagram for classifying a pixel (assigning one of three colors) based on wash-out rate, according to an aspect of the invention.

Then pixel classifier 1-15 calculates the wash-out pattern for each pixel starting from pixel(K min, v min) until it reaches pixel (K max, v max) and codes with color hue each pattern as shown in blocks 45 to 54. It will be understood that other colors, shades of gray, various shading schemes, or other modes of visual or oilier representation may be used for pixels of the calibration map. As shown in FIG. 3, according to an aspect of the present invention, color or hue of the pixel shows the change in intensity between $t_1$ and $t_2$ for that pixel. When the intensity $I(t_2)$ is less than $I(t_1)$, the color hue is red, when the reverse holds the color is blue and when the intensity is equal or close to equal, it is green. Most malignant tissue will be shown as red pixels, and most non-malignant tissue will be shown as blue. If will be understood that other colors may be used in addition to the foregoing or instead of the forgoing. Also, other types of visual representations, such as shading or the like may be used instead of or in addition to colors. The definitions of higher, lower and equal intensities depend on the noise level, and can be adjusted to be above the noise level.

Figure 5:
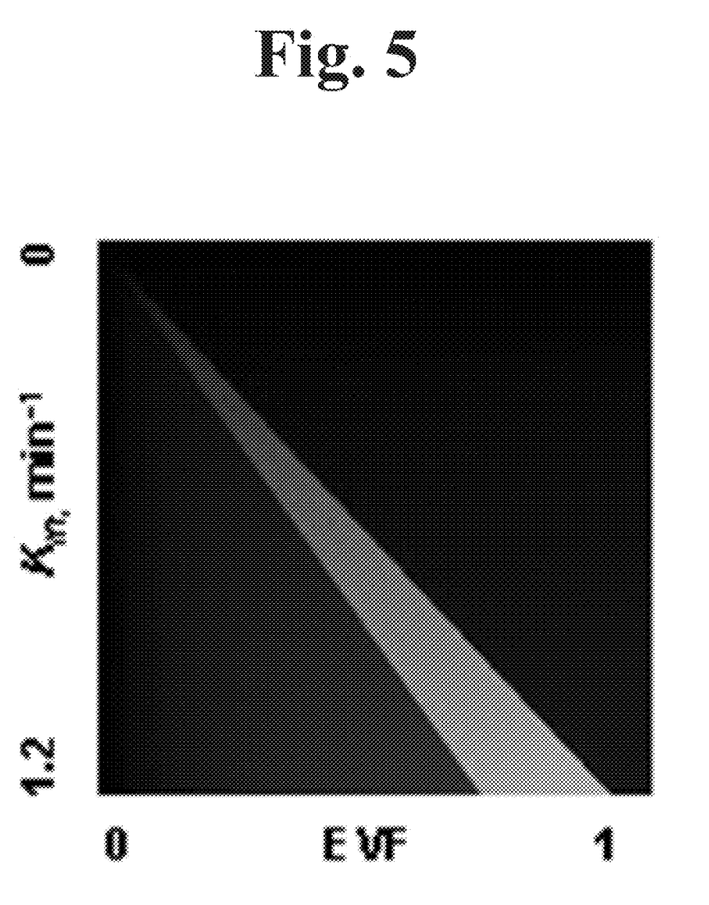
FIG. 5 shows an example of a calibration map according to an aspect of the present invention.

Continuing with the example of the calibration map generation process illustrated in FIG. 4, at this point all pixels have a color hue and a normalized color intensity. Visual representation output 1-16 produces in block 56 of FIG. 4b as the output a calibration map of K, v for the selected $T_0$, $T_1$, $T_2$ and system and measurement parameters. The output consists of a calibration map of the two variables K and y ranging between K min, v min to K max, v max for a specific set of lime points and the other inputs. Each pixel in this map with specific K, v values has a color hue and a color intensity, FIG. 5 is an example of a color-coded (in black and white) calibration map with the red region shown on the left lower portion with more pixels in the higher K, lower v range, and blue region shown on the right upper portion with more pixels in the lower K, higher v range.

If the calibration map is not satisfactory, for example, if it is excessively slanted toward one color hue, new time points are chosen in a direction to correct the calibration map and bring it to a more satisfactory balance from a color, distribution standpoint. Accordingly, in subsequent iterations, the program cycles through the steps in the flow diagram again using the new inputs until a satisfactory calibration map is obtained, which sets the selected time points and system parameters. A satisfactory calibration map is defined by reaching a certain distribution of the colors or of the colors and color intensities. For example, a satisfactory map can be a map that divides the K-v plane, or volume between the three colors to approximately three equal areas, namely, approximately a third of the pixels in the calibration map are red, a third are green and a third are blue. Also, new time points $T_1$ and $T_2$ may be selected to arrive at a calibration map such that the red color is assigned to approximately 75% of grid points representing malignant tissue.

According to an embodiment of the present invention, "smoothing" may be used based on four or more surrounding pixels to provide for an enhanced visual representation. The color hue and intensity of each pixel is assigned after taking into account the values of the eight surrounding pixels as well. It will be understood that several known smoothing methods may be used to perform smoothing according to this embodiment of the invention.

FIG. 3 describes the coloring means using color hue and color intensity according to the 3 TP method. The color hue presents the washout of contrast agent from the tumor between the two post contrast time points, and the color intensity the wash-in rate between the pre-contrast and first post contrast time point. For each pattern of wash-out coded by a color hue, there can a wash-in rate which relates to the intensity function which determines color intensity. The separation between different wash-in rates depends on the range of color intensities chosen. Color intensities range between 0 to 255, with the fastest initial rate sealed to 255. FIG. 5 is a schematic illustration of the 3 TP calibration map for the pre-selected time points: 0, 0.5 and 2.5 min. Based on the model equation, a calibration map is calculated that relates changes in the color coding of the enhancement to kin and EVF ($v_e = k_{in}/k_{ep}$).

While preferred embodiments of the invention have been described, it will be understood that various modifications and changes in form or detail could readily be made without departing from the spirit of the invention. It is therefore intended that the invention be not limited to the exact forms described and illustrated, but should be construed to cover all modifications that may fall within the scope of the appended claims.

What is claimed is:

1. A method of providing a malignancy classification based on MRI data for a region of lung tissue, the method comprising:
   a) setting time points $T_1$ and $T_2$ measured from a time point $T_o$ at or near an injection of a contrast agent, time point $T_1$ representing a wash-in time point for a selected region of lung tissue and time point $T_2$ representing a wash-out time point for the selected region of lung tissue;
   b) wherein malignancy is indicated by a second concentration value of the injected contrast agent correlated with signal intensity of MRI for the selected region of lung tissue at $T_2$ being less than or substantially equal to a first concentration value of the contrast agent correlated with signal intensity of MRI for the selected region of lung tissue at $T_1$, and non-malignancy is indicated by a third concentration value of the injected contrast agent correlated with signal intensity of MRI for the selected region of lung tissue at $T_1$ being less than or substantially equal to a fourth concentration value of the injected contrast agent concentration correlated with signal intensity of MRI for the selected region of lung tissue at $T_2$;
   c) wherein the setting of the time points $T_1$ and $T_2$ is determined according to a calibration map obtained by calculating concentration values of injected contrast agent at initial time points $T_1$ and $T_2$ arranged in a grid with axes K and v, K representing microvascular permeability from a minimum to a maximum and v representing extracellular volume fraction from a minimum to a maximum, assigning one of multiple categories to each grid point based on a degree of change in concentration values of the injected contrast agent between initial time point $T_1$ and initial time point $T_2$ and adjusting the time points $T_1$ and $T_2$ so that the resulting calibration map indicates, according to a preselected condition, grid points of a first category having a relatively high degree of change and grid points of a second category having a relatively low degree of change;
   d) obtaining by MRI scanning a first sample concentration value of the contrast agent correlated to detected signal intensity for the region of lung tissue at set time point $T_1$ and a second sample concentration value of the contrast agent correlated to detected signal intensity for the region of lung tissue at set time point $T_2$;
   e) determining a malignancy classification for the region of lung tissue by comparing the obtained sample concentration values with a predetermined malignancy profile; and
   f) outputting a representation of the malignancy classification of the region of lung tissue.

2. The method of claim 1, wherein in step b) the second concentration value of the contrast agent is greater than the fourth concentration value of the contrast agent.

3. The method of claim 1, wherein said determining the malignancy classification in step e) comprises judging that the region of lung tissue contains malignancy when the first obtained sample concentration value of the contrast agent is greater than the second obtained sample concentration value of the contrast agent.

4. The method of claim 1, wherein said determining the malignancy classification in step e) comprises judging that the region of lung tissue contains malignancy when the first obtained sample concentration value is substantially equal to the second obtained sample concentration value, and the first obtained sample concentration value is higher than a predetermined first threshold concentration value.

5. The method of claim 1, wherein said determining the malignancy classification in step e) comprises judging that the region of lung tissue contains no malignancy when the first obtained sample concentration value is less than the second obtained sample concentration value.

6. The method of claim 1, wherein said determining the malignancy classification in step e) comprises judging that the region of lung tissue contains no malignancy when the first obtained sample concentration value is substantially equal to the second obtained sample concentration value, and the first obtained sample concentration value is less than a predetermined second threshold concentration value.

7. The method of claim 1, wherein the setting of the time points $T_1$ and $T_2$ results in a calibration map such that grid points of a first category for grid points with a relatively high degree of change and grid points of a second category for grid points with a relatively low degree of change are approximately equally represented in the calibration map.

8. The method of claim 1, wherein a third category is assigned to grid points with a degree of change within a predetermined range between high and low, the predetermined range being based on a noise level relative to signal strength.

9. The method of claim 8, wherein the predetermined range comprises a range of percent change substantially equal to the noise level relative to signal strength.

10. The method of claim 8, wherein the degree of change falling within the predetermined range is plus or minus 10%.

11. The method of claim 1, wherein said preselected condition comprises at least one of coloring and shading the grid points.

12. The method of claim 1, wherein $T_1$ and $T_2$ are set such that the first category is assigned to approximately 75% of grid points representing malignant tissue.

13. The method of claim 1, wherein the representation of the malignancy classification is color-coded image data.

14. The method of claim 1, wherein the representation is a voxel representation.

15. The method of claim 1, wherein the region of lung tissue is evaluated based on the spatial distribution of malignant tissue in the representation.

16. The method of claim 1, wherein registration is used to correct for shifting of the region of tissue in obtaining the concentration values.

17. The method of claim 1, wherein said outputting of the representation comprises outputting a visual representation.

18. The method of claim 1, wherein said outputting of the representation comprises smoothing based on surrounding pixels.

19. A computer-readable medium incorporating a program of instructions for providing a malignancy classification for a region of lung tissue based on MRI data, the program of instructions comprising:
    instructions for setting time points $T_1$ and $T_2$ measured from a time point $T_o$ at or near an injection of a contrast agent, time point $T_1$ representing a wash-in time point for a selected region of lung tissue and time point $T_2$ representing a wash-out time point for the selected region of lung tissue,
    wherein malignancy is indicated by a second concentration value of the injected contrast agent correlated with signal intensity of MRI for the selected region of lung tissue at $T_2$ being less than or substantially equal to a first concentration value of the contrast agent correlated with signal intensity of MRI for the selected region of lung tissue at $T_1$, and non-malignancy is indicated by a third concentration value of the injected contrast agent correlated with signal intensity of MRI for the selected region of lung tissue at $T_1$ being less than or substantially equal to a fourth concentration value of the injected contrast agent concentration correlated with signal intensity of MRI for the selected region of lung tissue at $T_2$;
    instructions for setting of the time points $T_1$ and $T_2$ according to a calibration map obtained by calculating concentration values of injected contrast agent at initial time points $T_1$ and $T_2$ arranged in a grid with axes K and v, K representing microvascular permeability from a minimum to a maximum and v representing extracellular volume fraction from a minimum to a maximum, assigning one of a plurality of categories to each grid point based on a degree of change in concentration values of the injected contrast agent between initial time point $T_1$ and initial time point $T_2$ and adjusting the time points $T_1$ and $T_2$ so that the resulting calibration map indicates, according to a preselected condition, grid points of a first category having a relatively high degree of change and grid points of a second category having a relatively low degree of change;
    instructions for obtaining by MRI scanning a first sample concentration value of the contrast agent correlated to detected signal intensity for the region of lung tissue at set time point $T_1$ and a second sample concentration value of the contrast agent correlated to detected signal intensity for the region of lung tissue at set time point $T_2$;
    instructions for determining a malignancy classification for the region of lung tissue by comparing the obtained sample concentration values with a predetermined malignancy profile; and
    instructions for outputting a representation of the malignancy classification of the region of lung tissue.

20. The medium of claim 19, wherein the second concentration value of the contrast agent is greater than the fourth concentration value of the contrast agent.

21. The medium of claim 19, wherein said instructions for determining the malignancy classification comprise instructions for judging that the region of lung tissue contains malignancy when the first obtained sample concentration value of the contrast agent is greater than the second obtained sample concentration value of the contrast agent.

22. The medium of claim 19, wherein said instructions for determining the malignancy classification comprise instructions for judging that the region of lung tissue contains malignancy when the first obtained sample concentration value is substantially equal to the second obtained sample concentration value, and the first obtained sample concentration value is higher than a predetermined first threshold concentration value.

23. The medium of claim 19, wherein said instructions for determining the malignancy classification comprise instructions for judging that the region of lung tissue contains no malignancy when the first obtained sample concentration value is less than the second obtained sample concentration value.

24. The medium of claim 19, wherein said instructions for determining the malignancy classification comprise instructions for judging that the region of lung tissue contains no malignancy when the first obtained sample concentration value of the contrast agent is substantially equal to the second obtained sample concentration value of the contrast agent, and the first obtained sample concentration value of the contrast agent is less than a predetermined second threshold concentration value of the contrast agent.

25. The medium of claim 19, wherein said instructions for setting of the time points $T_1$ and $T_2$ result in a calibration map such that grid points of a first category for grid points with a relatively high degree of change and grid points of a second category for grid points with a relatively low degree of change are approximately equally represented in the calibration map.

26. The medium of claim 19, wherein a third category of the multiple categories is assigned to grid points with a degree of change within a predetermined range, the predetermined range being based on a noise level relative to signal strength.

27. The medium of claim 26, wherein the predetermined range comprises a range of percent change substantially equal to the noise level relative to signal strength.

28. The medium of claim 26, wherein the degree of change falling within the predetermined range is plus or minus 10%.

29. The medium of claim 19, wherein said instructions for assigning of the one of the three categories comprise at least one of coloring and shading the grid points according to the preselected condition.

30. The medium of claim 19, wherein time point $T_1$ and time point $T_2$ are set such that approximately 75% of grid points represent malignant tissue.

31. The medium of claim 19, wherein the representation of the malignancy classification is color-coded image data.

32. The medium of claim 19, wherein the representation is a voxel representation.

33. The medium of claim 19, wherein the region of lung tissue is evaluated based on the spatial distribution of malignant tissue in the representation.

34. The medium of claim 19, wherein registration is used to correct for shifting of the region of tissue in obtaining the concentration values of injected contrast agent.

35. The method of claim 19, wherein said instructions for outputting the representation comprise instructions for outputting a visual representation.

36. The medium of claim 19, wherein said instructions for outputting the representation comprise instructions for smoothing based on surrounding pixels.

\* \* \* \* \*